(12) United States Patent
Hsu et al.

(10) Patent No.: US 9,291,869 B2
(45) Date of Patent: Mar. 22, 2016

(54) DISPLAY DEVICE

(71) Applicant: Innolux Corporation, Miao-Li County (TW)

(72) Inventors: Hsu-Kuan Hsu, Miao-Li County (TW); Hsia-Ching Chu, Miao-Li County (TW); Kuei-Ling Liu, Miao-Li County (TW); Fu-Cheng Chen, Miao-Li County (TW); Kuo-Hao Chiu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/315,374

(22) Filed: Jun. 26, 2014

(65) Prior Publication Data

US 2015/0062508 A1 Mar. 5, 2015

(30) Foreign Application Priority Data

Aug. 28, 2013 (TW) .............................. 102130893 U

(51) Int. Cl.
| | |
|---|---|
| *G02F 1/1337* | (2006.01) |
| *G02F 1/1362* | (2006.01) |
| *G02F 1/1339* | (2006.01) |
| G02F 1/1333 | (2006.01) |
| G02F 1/137 | (2006.01) |

(52) U.S. Cl.
CPC ........ *G02F 1/136209* (2013.01); *G02F 1/1337* (2013.01); *G02F 1/1339* (2013.01); *G02F 1/13392* (2013.01); *G02F 1/13394* (2013.01); *G02F 1/133753* (2013.01); *G02F 1/133788* (2013.01); *G02F 2001/13396* (2013.01); *G02F 2001/13775* (2013.01); *G02F 2001/133388* (2013.01); *G02F 2001/133776* (2013.01); *G02F 2202/36* (2013.01)

(58) Field of Classification Search
CPC .......................... G02F 1/13394; G02F 1/13392
See application file for complete search history.

(56) References Cited

U.S. PATENT DOCUMENTS

| | | | |
|---|---|---|---|
| 7,643,108 B2 | 1/2010 | Huang et al. | |
| 2002/0101558 A1* | 8/2002 | Nemeth | ........................ 349/192 |

(Continued)

FOREIGN PATENT DOCUMENTS

TW            200841103 A     10/2008

OTHER PUBLICATIONS

Hanaoka, et al.: "40.1: A New MVA-LCD by Polymer Sustained Alignment Technology"; SID 04 Digest; Copyright 2004; pp. 1200-1203.

(Continued)

*Primary Examiner* — Phu Vu
(74) *Attorney, Agent, or Firm* — McClure, Qualey & Rodack, LLP

(57) ABSTRACT

A display device is provided. The display device includes a display panel. The display panel includes a first substrate, a second substrate, at least a data line, at least a scan line, a wiring area, a liquid crystal layer, an alignment layer, a plurality of spacers, a seal, and a plurality of agglomerate polymer particles formed on the alignment layer. The first substrate has at least a pixel area having a pixel, the data line and the scan line intersected for defining the pixel area. The liquid crystal layer, the alignment layer, and the spacers are disposed between the first substrate and the second substrate. The wiring area is located outside the pixel area. The distribution density of the agglomerate polymer particles located corresponding to at least a portion of the wiring area is higher than the distribution density of those located corresponding to the pixel area.

11 Claims, 4 Drawing Sheets

(56) References Cited

U.S. PATENT DOCUMENTS

2008/0252807 A1  10/2008  Huang et al.
2010/0188623 A1   7/2010  Nakagawa
2011/0304526 A1  12/2011  Itoh

OTHER PUBLICATIONS

EP Search Report dated Apr. 8, 2014.
TW Office Action dated Jul. 16, 2015 in corresponding Taiwan application (No. 102130893).

* cited by examiner

DISPLAY DEVICE

This application claims the benefit of Taiwan application Ser. No. 102130893, filed Aug. 28, 2013, the subject matter of which is incorporated herein by reference.

BACKGROUND OF THE INVENTION

1. Field of the Invention

The disclosure related in general to a display device, and particularly to a display device having superior display quality.

2. Description of the Related Art

Liquid crystal displays have been applied in a variety of electronic products, such as laptops, tablet PCs, and etc. Moreover, along with the rapid advance of large-sized flat panel displays in the market, liquid crystal displays with light weight and miniaturized sizes have played very important roles and gradually replaced CRT displays to become the main stream in the market.

Currently, vertical alignment liquid crystal display panels are one of the main stream products. However, vertical alignment liquid crystal display panels have issues of light leakage, which affect the display quality thereof. Therefore, researchers have been working on providing vertical alignment liquid crystal display panels having superior display quality.

SUMMARY OF THE INVENTION

The disclosure is directed to a display device. In the embodiments, the agglomerate polymer particles located corresponding to at least a portion of the wiring area have a higher distribution density than those located corresponding to the pixel area, such that the light transmittance of the wiring area is lowered; accordingly, the light leakage of the display device is reduced, and the qualities of the display images are improved.

According to an embodiment of the present disclosure, a display device is provided. The display device includes a display panel. The display panel includes a first substrate, a second substrate, at least a data line, at least a scan line, a wiring area, a liquid crystal layer, an alignment layer, a plurality of spacers, a seal, and a plurality of agglomerate polymer particles. The first substrate and the second substrate are disposed opposite to the first substrate, and the first substrate has at least a pixel area having a pixel. The data line and the scan line are intersected for defining the pixel area. The wiring area is located outside the pixel area. The liquid crystal layer, the alignment layer, and the spacers are disposed between the first substrate and the second substrate. The seal is disposed between the first substrate and the second substrate and located outside the wiring area. The agglomerate polymer particles are formed on the alignment layer. The distribution density of the agglomerate polymer particles located corresponding to at least a portion of the wiring area is higher than the distribution density of those located corresponding to the pixel area.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
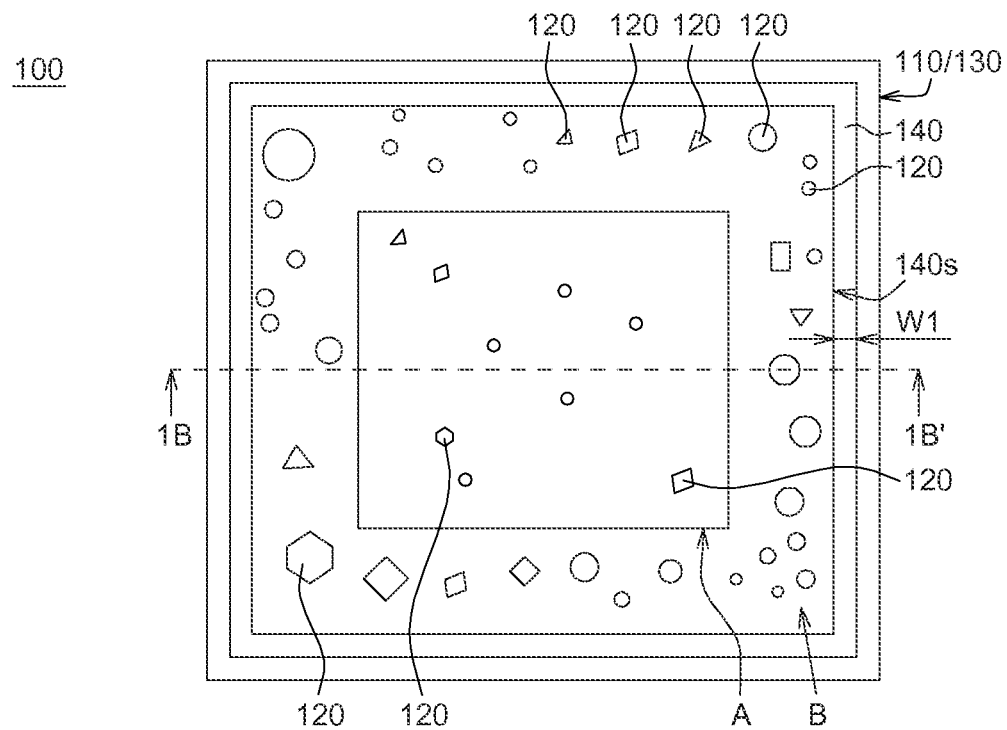
FIG. 1A shows a top view of a display panel according to an embodiment of the present disclosure.

According to the embodiments of the present disclosure, in the display device, the agglomerate polymer particles located corresponding to at least a portion of the wiring area have a higher distribution density than those located corresponding to the pixel area, such that the light transmittance of the wiring area is lowered; accordingly, the light leakage of the display device is reduced, and the qualities of the display images are improved. The embodiments are described in details with reference to the accompanying drawings. The identical elements of the embodiments are designated with the same or similar reference numerals. Also, it is to be noted that the drawings may be simplified for illustrating the embodiments. Thus, the specification and the drawings are to be regard as an illustrative sense rather than a restrictive sense. The details of the structures of the embodiments are for exemplification only, not for limiting the scope of protection of the disclosure. Detailed structures may be modified or changed by one skilled in the art after having the benefit of this description of the disclosure.

Figure 1B:
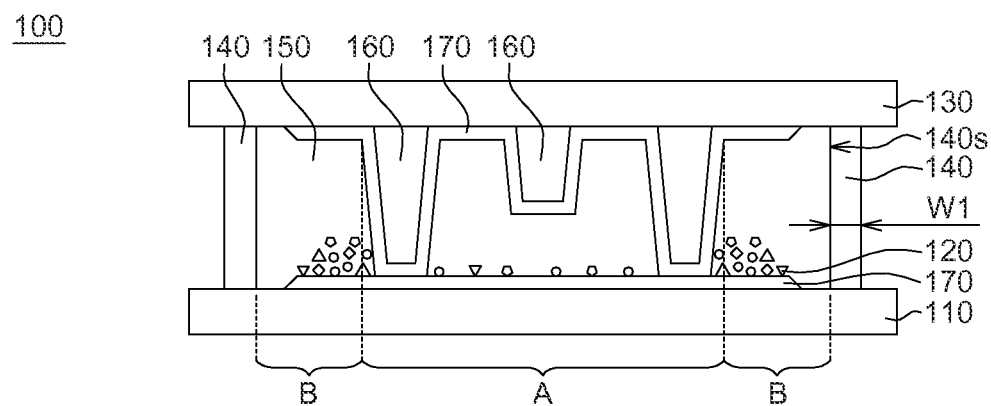
FIG. 1B shows a cross-sectional view along the cross-sectional line 1B-1B' of FIG. 1A.

FIG. 1A shows a top view of a display panel 100 according to an embodiment of the present disclosure, and FIG. 1B shows a cross-sectional view along the cross-sectional line 1B-1B' of FIG. 1A. Referring to FIGS. 1A-1B, the display panel 100 includes a first substrate 110 and a plurality of agglomerate polymer particles 120. The first substrate 110 has a display area A and a non-display area B adjacent to the display area A. The display area A represents the area of the display panel 100 for displaying images, and the non-display area B represents the area not for displaying images. The agglomerate polymer particles 120 are disposed on the first substrate 110. In an embodiment, as shown in FIG. 1A, the non-display area B surrounds the display area A.

In the embodiment, the distribution density of the agglomerate polymer particles 120 located in at least a portion of the non-display area B is different from the distribution density of the agglomerate polymer particles 120 located in the display area A. In other words, the agglomerate polymer particles 120 located in different portions of the non-display area B may have different distribution densities; that is, the agglomerate polymer particles 120 located in at least some portions of the non-display area B have distribution densities different from the distribution density of the agglomerate polymer particles 120 located in the display area A. Moreover, the agglomerate polymer particles 120 have irregular shapes and sizes. In the embodiment, the display area A is such as an area in the pixel area for displaying images, and the non-display area B is such as a wiring area. However, the non-display area B may include any area which is not for displaying images and is not limited to the above-mentioned example.

In an embodiment, the distribution density of the agglomerate polymer particles 120 located in the non-display area B having a size of 10-50 nm is different from the distribution density of the agglomerate polymer particles 120 located in the non-display area B having a size of 50-100 nm. Moreover, among the agglomerate polymer particles 120 located in the non-display area B, those with a size of 10-50 nm have a higher distribution density than those with a size of 50-100 nm.

In another embodiment, among the agglomerate polymer particles 120 having a size of 50-100 nm, those located in at least a portion (e.g. some local regions) of the non-display area B have a different distance between the agglomerate polymer particles 120 from the distance between those located in the display area A. For example, among the agglomerate polymer particles 120 having a size of 50-100 nm, the distance between any two of the adjacent agglomerate polymer particles 120 located in the non-display area B is different from the distance between any two of the adjacent agglomerate polymer particles 120 located in the display area A. In an embodiment, among the agglomerate polymer particles 120 having a size of 50-100 nm, the distance between any two of the adjacent agglomerate polymer particles 120 located in the non-display area B is smaller than the distance between any two of the adjacent agglomerate polymer particles 120 located in the display area A. It is to be noted that the distance described herein indicates at least one of a minimum distance or an average distance.

In the embodiment, the agglomerate polymer particles 120 located in the non-display area B do not have any particular arrangement(s) and orientation(s). In other words, the agglomerate polymer particles 120 are arranged irregularly on the first substrate 110. The agglomerate polymer particles 120 located in the display area A have particular arrangement(s) for aligning the liquid crystals to tilt toward particular direction(s). The agglomerate polymer particles 120 located in different areas may be provided with different functions according to the irradiation curing process applied thereon and whether an electric field is applied thereon. The distribution density of the agglomerate polymer particles 120 located in at least a portion of the non-display area B is higher than the distribution density of the irregularly arranged agglomerate polymer particles 120 located in the display area A. Since the agglomerate polymer particles 120 located in the non-display area B do not have any particular orientation(s), the liquid crystals in the area do not tilt toward particular direction(s), thereby the area turns into a dark area, which lowers the light transmittance, and hence the light leakage issue of the display panel 100 can be improved.

As shown in FIGS. 1A-1B, the display panel 100 may further include a second substrate 130, a seal 140, a liquid crystal layer 150, and a plurality of spacers 150. The second substrate 130 and the first substrate 110 are disposed opposite to each other. The liquid crystal layer 150 and the seal 140 are disposed between the first substrate 110 and the second substrate 130. The seal 140 is located outside the non-display area B. The spacers 160 are disposed between the first substrate 110 and the second substrate 130 for providing a gap for disposing the liquid crystal layer 150. The spacers 160 may have different heights for proving buffering when the panel is pressed. The agglomerate polymer particles 120 are in direct contact with the liquid crystal molecules in the liquid crystal layer 150. It is also important to point out that the agglomerate polymer particles 120 are not necessarily drawn to scale according to the actual products, and the drawings are for illustrating the embodiments only and not for limiting the scope of protection of the disclosure.

In the embodiment, since the agglomerate polymer particles 120 located in the non-display area B are not provided with any alignment functions for guiding particular directions, and accordingly are not provided with any alignment functions for the liquid crystal molecules. Therefore, in the non-display area B, the liquid crystal molecules in the liquid crystal layer 150 may tilt toward any possible directions, thereby the light transmittance of the non-display area is lowered, forming an excellent dark area, and the light leakage issue of the display panel 100 is improved, which further increases the contrast and quality of the images displayed in the display area.

According to the embodiments of the present disclosure, the agglomerate polymer particles 120 are not limited to have particular sizes or shapes, and the sizes can be adjusted according to application needs. In an embodiment, the distribution density of the agglomerate polymer particles 120 having a size of 10-100 nm located in the non-display area B is higher than the distribution density of the agglomerate polymer particles 120 having a size of 10-100 nm located in the display area A. In another embodiment, in the non-display area B, the distribution density of the agglomerate polymer particles 120 having a size of 10-50 nm is higher than the distribution density of the agglomerate polymer particles 120 having a size of 50-100 nm. In a further embodiment, in the non-display area B, the distribution density of the agglomerate polymer particles 120 having a size of 50-100 nm located on the first substrate 110 is lower than the distribution density of those located on the second substrate 130. It is important to point out that since the agglomerate polymer particles 120 do not have particular shapes, the term of "size" refers to the dimension(s) of the agglomerate polymer particles 120, which may be diameter, height, width, or any expression suitable for representing the size of one agglomerate 120.

In the embodiment, the display panel 100 may further include a thin film transistor array and a color filter layer on the first substrate 110. In an alternative embodiment, the color filter layer may be disposed on the second substrate 130.

In the embodiment, the display panel 100 may further include an alignment layer 170 disposed between the first substrate 110 and the second substrate 130. For example, the alignment layer 170 is disposed on the first substrate 110 or on the second substrate 130, and the agglomerate polymer particles 120 are formed on the alignment layer 170. In an embodiment, as shown in FIGS. 1A-1B, the display panel 100 may include two alignment layers 170 formed on the first substrate 110 and the second substrate 130, respectively, and the agglomerate polymer particles 120 are formed on the alignment layer 170 located close to the first substrate 110. In the embodiment, the alignment layer 170 may be a polyimide (PI) film.

In the embodiment, the agglomerate polymer particles 120 may be formed by a variety of processes. In an embodiment, UV curable monomers are added while forming the liquid crystal layer 150 or the alignment layer 170, and then a UV irradiation process is performed from the first substrate 110 side or the second substrate 130 side for forming the agglomerate polymer particles 120 on the first substrate 110 or on the alignment layer 170. The material of the agglomerate polymer particles 120 formed by irradiating UV curable monomers is polymer. Polymerization degrees of the polymer in different areas are different from one another; thereby the distribution densities of the agglomerate polymer particles 120 in different areas are different.

In an embodiment, the display panel 100 is such as a nano-protrusion vertical aligned liquid crystal display panel, and the agglomerate polymer particles 120 and the nano-protrusion alignment structure on the surface of the alignment layer 170 can be formed from the same monomers. For example, the nano-protrusion alignment structure can be formed in the display area A by polymerizing the monomers in the display area A while an external electric field is continuously applied thereon, and the agglomerate polymer particles 120 can be formed by polymerizing the monomers in the non-display area B without applying any external electric field, the agglomerate polymer particles 120 being irregularly arranged and lacking particular alignment directions. As such, the nano-protrusion alignment structure located in the display area A can help the liquid crystal molecules to align with predetermined direction(s), and the agglomerate polymer particles 120, lacking particular alignment directions, located in the non-display area B can cause the liquid crystal molecules in the non-display area B to tilt toward various directions for forming an excellent dark area. As such, the possibility of the light leakage of the display panel 100 is decreased, and the contrast and the displaying quality of the display panel 100 are improved.

The aforementioned nano-protrusion alignment structure and the agglomerate polymer particles 120 located in different designated areas may be manufactured by various processes. For example, via the design of a patterned electrode, wherein the patterned electrode is not formed on the area of the substrate corresponding to the non-display area B, the monomers located corresponding to the non-display area B are therefore not influenced by the electric field while being cured by UV irradiation. Alternatively, a patterned mask is applied to shield the non-display area B while the monomers are irradiated with UV light and applied with a continuously electric field, such that the monomers in the non-display area B do not undergo polymerization reaction, and the monomers in the non-display area B undergo polymerization under UV irradiation after the electric field is removed.

Furthermore, the above-mentioned shielding design from the UV irradiation for the non-display area B can utilize additional patterned masks or structural arrangements of originally existing elements in the display panel. For example, a metal wiring or a black matrix located in the non-display area B can be used for shielding the non-display area B from UV irradiation. The black matrix can be designed as a patterned black matrix with through holes for UV light to pass through, such that the monomers in the non-display area B may undergo polymerization reaction to form the agglomerate polymer particles 120. In the embodiment, the UV irradiation is preferably performed from the substrate side without the color filter layer disposed thereon.

In other words, the formation of a number of the agglomerate polymer particles 120, which are irregularly arranged and lack alignment functions, in the non-display area B can further consume the residual monomers in the liquid crystal layer 150. As such, the polar impurities absorbed by the un-reacted monomers in the liquid crystal layer 150 or that the residual monomers polymerize and form protrusion structures with alignment functions in the non-display area B can be reduced. Accordingly, deterioration of materials is reduced, light leakage of the display panel is decreased, and the contrast and displaying quality of the display panel can be further improved.

Figure 2:
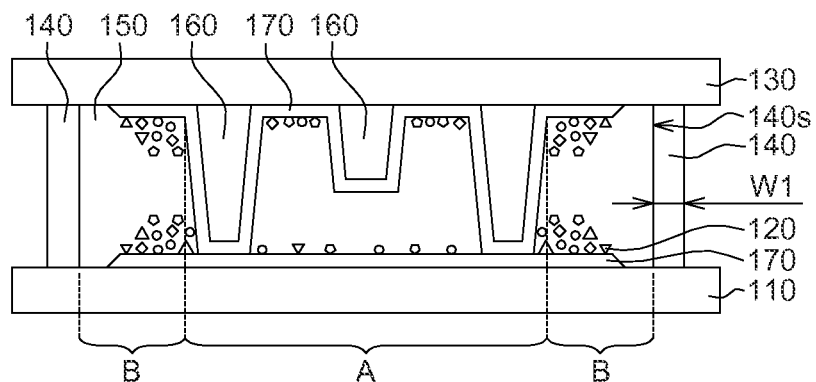
FIG. 2 shows a cross-sectional view of a display panel according to another embodiment of the present disclosure.

FIG. 2 shows a cross-sectional view of a display panel 200 according to another embodiment of the present disclosure. As shown in FIG. 2, a plurality of the agglomerate polymer particles 120 may be further disposed on the second substrate 130. In the embodiment, in the non-display area B, the distribution density of the agglomerate polymer particles 120 located on the first substrate 110 is different from the distribution density of the agglomerate polymer particles 120 located on the second substrate 130. For example, while the agglomerate polymer particles 120 are formed by a UV curing process performed on UV curable monomers, the agglomerate polymer particles 120 formed on the UV irradiation side of the substrate, which side is closer to the UV light, have a relatively high distribution density and a relatively large size. Alternatively, the sizes and the locations of the agglomerate polymer particles 120 can be controlled by adjusting the focus or the wavelength range of the UV irradiation.

In an embodiment, in the non-display area B, the distribution density of the agglomerate polymer particles 120 having a size of 50-100 nm located on the first substrate 110 is lower than the distribution density of the agglomerate polymer particles 120 located on the second substrate 130. In the present embodiment, the agglomerate polymer particles 120 are formed by a UV irradiation process performed on UV curable monomers, and the UV irradiation process is performed from the second substrate 130 side.

Figure 3:
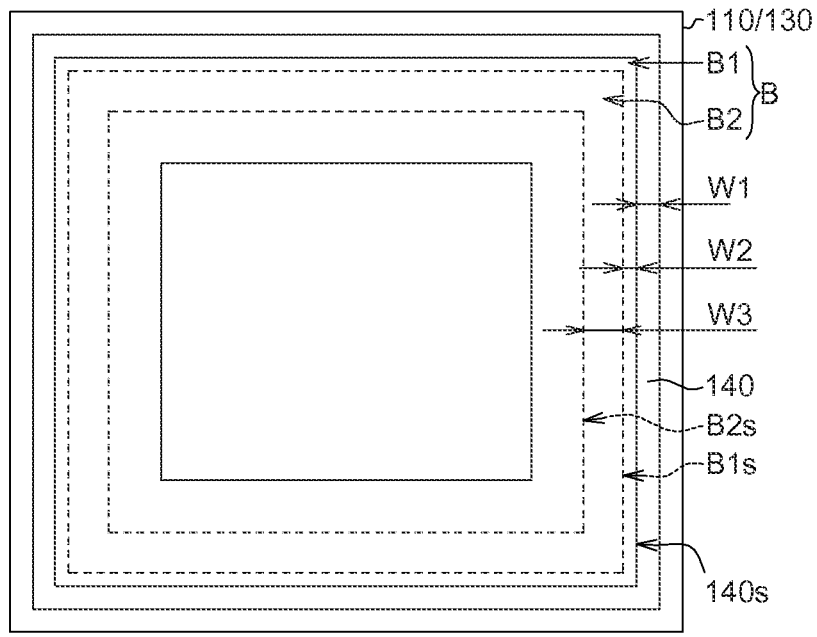
FIG. 3 shows a top view of a display panel according to a further embodiment of the present disclosure.

FIG. 3 shows a top view of a display panel 300 according to a further embodiment of the present disclosure. As shown in FIG. 3, the seal 140 has a first width W1 and a first sidewall 140s, and the first sidewall 140s is adjacent to the non-display area B. The non-display area B can be divided into two regions B1 and B2. The region B1 includes the range starting from the first sidewall 140s and extending a second width W2 away from the first sidewall 140s, the second width W2 is the distance between the first sidewall 140s and the second sidewall B1s, and the second width W2 is less than the first width W1. The region B2 includes a range starting from the second sidewall B1s and extending a third width W3 away from the second sidewall B1 s, the third width W3 is the distance between the second sidewall B1s and the third sidewall B2s, and the third width W3 is larger than one time the first width W1 to less than two times the first width W1. In the embodiment, the distribution density of the agglomerate polymer particles 120 on the second substrate 130 and located in the region B1 is different from the distribution density of the agglomerate polymer particles 120 located in the region B2. The amount of the agglomerate polymer particles 120 having a size of 50-100 nm located in the region B1 is more than the amount of the agglomerate polymer particles 120 having a size of 50-100 nm located in the region B2. In the embodiment, by controlling the range the UV irradiation covers and the wavelength of the UV irradiation, the agglomerate polymer particles 120 can be formed together with the curing of the seal 140 by the UV irradiation process. Accordingly, the seal 140 and the agglomerate polymer particles 120 can be formed in single UV irradiation step. As such, the irradiation energy is reduced, the monomers neighboring the seal 140 can react together and form the agglomerate polymer particles 120 having relatively large sizes, and the light leakage of the display panel can be further reduced.

Figure 4:
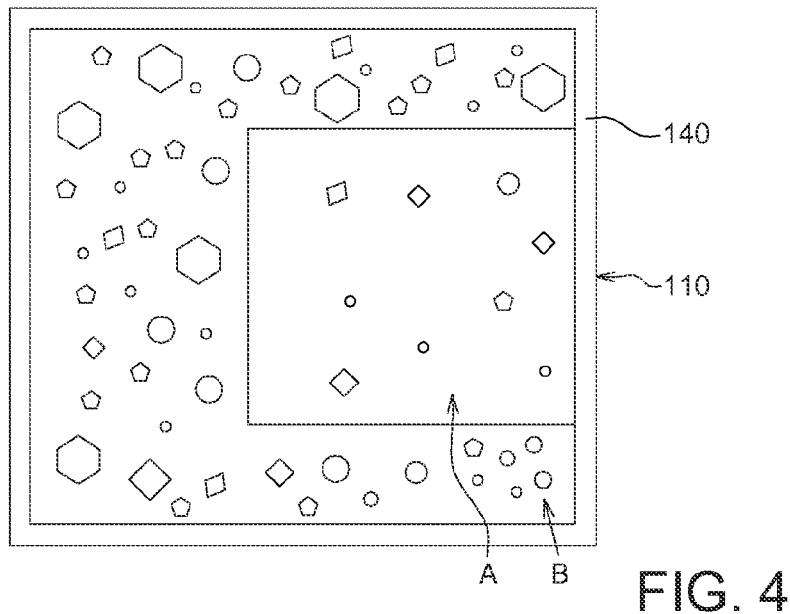
FIG. 4 shows a top view of a display panel according to a still further embodiment of the present disclosure.

FIG. 4 shows a top view of a display panel 400 according to a still further embodiment of the present disclosure. In the embodiment, as shown in FIG. 4, the non-display area B' is disposed adjacent to the display area A' but not surrounding the display area A'. The distribution density of the agglomerate polymer particles 120 located in at least a portion of the non-display area B' is different from the distribution density of the agglomerate polymer particles 120 located in the display area A'. In an embodiment, the distribution density of the agglomerate polymer particles 120 having a size of 10-100 nm located in the non-display area B' is higher than the distribution density of the agglomerate polymer particles 120 having a size of 10-100 nm located in the display area A'. In another embodiment, the distribution density of the agglomerate polymer particles 120 (with no size limitation) located in at least a portion of the non-display area B' is higher than the distribution density of the agglomerate polymer particles 120 (with no size limitation) located in the display area A'.

Figure 5:
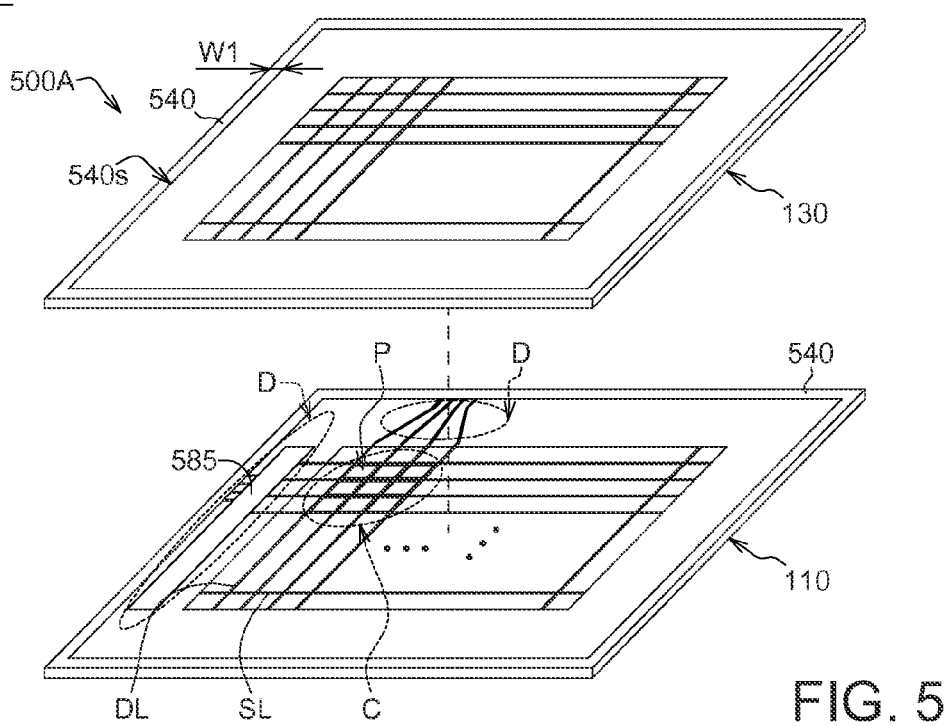
FIG. 5 shows a simplified explosion diagram of a display device according to an embodiment of the present disclosure.
Figure 6:
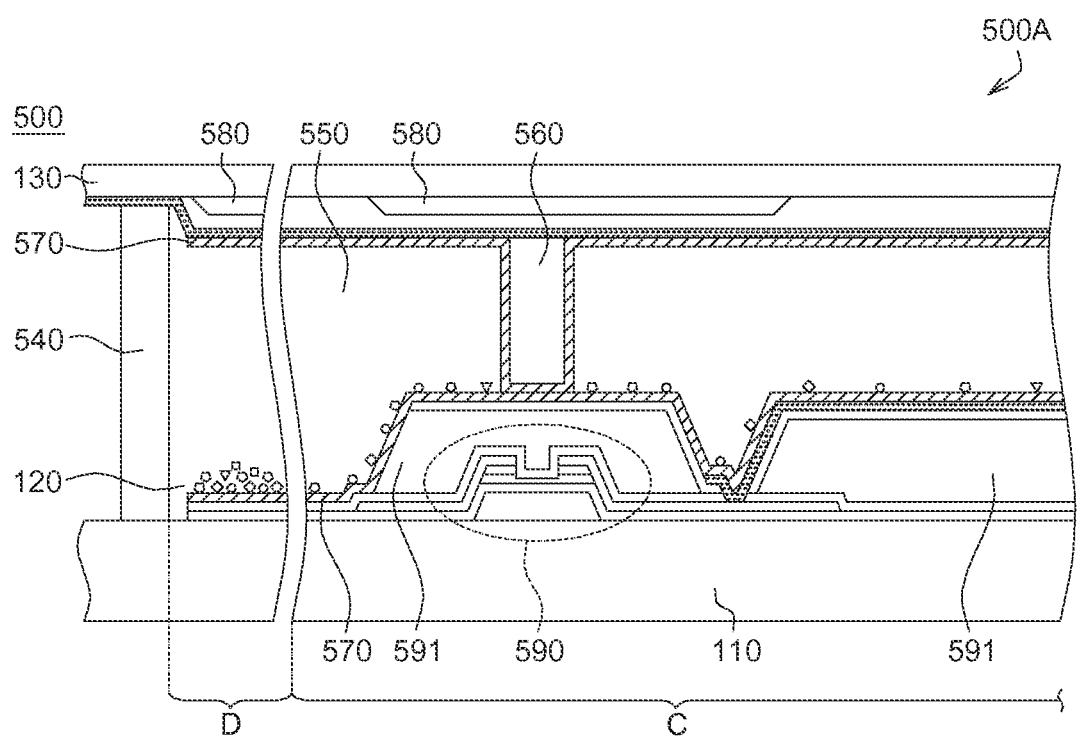
FIG. 6 shows a cross-sectional view of a display device according to another embodiment of the present disclosure.

FIG. 5 shows a simplified explosion diagram of a display device 500 according to an embodiment of the present disclosure, and FIG. 6 shows a cross-sectional view of a display device 600 according to another embodiment of the present disclosure. It is to be noted that some of the elements in FIGS. 5-6 are omitted or simplified for illustrating the embodiments. The details of the structures of the embodiments are not drawn to scale and for exemplification only, thus not for limiting the scope of protection of the disclosure. In the present embodiment, the seal 540 is adjacent to and aligned with the sidewalls of the substrates 110/130. In an alternative embodiment, the seal is not necessarily adjacent to the sidewalls of the substrate 110/130.

Referring to FIGS. 5-6, the display device 500 includes a display panel 500A. The display panel 500A includes the first substrate 110, the second substrate 130, at least a data line DL, at least a scan line SL, a wiring area D, the liquid crystal layer 550, the alignment layer 570, the spacers 560, the seal 540, and the agglomerate polymer particles 120. The first substrate 110 and the second substrate 130 are disposed opposite to each other. The first substrate 110 has at least a pixel area C having at least a pixel P. The data line DL and the scan line SL are intersected for defining the pixel area C. The wiring area D is located outside the pixel area C. The liquid crystal layer 550 and the alignment layer 570 are disposed between the first substrate 110 and the second substrate 130. The spacers 560 are disposed between the first substrate 110 and the second substrate 130 for providing a gap for disposing the liquid crystal layer 550. The seal 540 is disposed between the first substrate 110 and the second substrate 130 and located outside the wiring area D. The agglomerate polymer particles 120 are formed on the alignment layer 570. The distribution density of the agglomerate polymer particles 120 located corresponding to at least a portion of the wiring area D is higher than the distribution density of the agglomerate polymer particles 120 located corresponding to the pixel area C.

In the embodiment, the display panel 500A includes, for example, two alignment layers 570 formed on the first substrate 110 and the second substrate 130, respectively. The agglomerate polymer particles 120 are formed on at least one of the alignment layers 570 on at least one of the first substrate 110 or the second substrate 130. The above-mentioned agglomerate polymer particles 120 located corresponding to the wiring area D or corresponding to the pixel area C may be formed on both of the alignment layer 570 on the first substrate 110 and the second substrate 130. In fact, the above-mentioned agglomerate polymer particles 120 located corresponding to the wiring area D or corresponding to the pixel area C simply refers to the range which the agglomerate polymer particles 120 are located corresponding to.

As shown in FIGS. 5-6, the display device 500 may further include a black matrix (BM) 580, a thin film transistor array 590, and a color filter layer 591. The thin film transistor array 590 and the color filter layer 591 are disposed on the first substrate 110, and the black matrix 580 is disposed on the second substrate 130. In the embodiment, the wiring area D may include one or more than one driver on panel 585, such as a gate driver on panel (GOP) or a data drive on panel or both of the above. One set of GOP is illustrated in FIG. 5; however, a plurality sets of the gate driver and/or the data drive on panel may be arranged as well depending on the design requirements.

In an embodiment, in the wiring area D, the distribution density of the agglomerate polymer particles 120 on the first substrate 110 is different from the distribution density of the agglomerate polymer particles 120 on the second substrate 130.

In an embodiment, in the wiring area D, the distribution density of the agglomerate polymer particles 120 having a size of 10-50 nm is higher than the distribution density of the agglomerate polymer particles 120 having a size of 50-100 nm.

In an embodiment, referring to FIGS. 3 and 5-6, the seal 540 has the first width W1 and the first sidewall 540s adjacent to the wiring area D. The wiring area D can be divided into two regions. The first region includes the range starting from the first sidewall 540s and extending the second width W2 away from the first sidewall 540s, and the second width W2 is less than the first width W1. The second region includes a range starting from the first region and extending the third width W3 away from the sidewall adjacent to the first region, and the third width W3 is higher than one time the first width W1 to less than two times the first width W1. In the embodiment, the distribution density of the agglomerate polymer particles 120 on the second substrate 130 and located in the first region is different from the distribution density of the agglomerate polymer particles 120 located in the second region.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
    a display panel, comprising:
    a first substrate and a second substrate disposed opposite to the first substrate, wherein the first substrate has at least a pixel area having a pixel;
    at least a data line and at least a scan line intersected for defining the pixel area;
    a wiring area located outside the pixel area;
    a liquid crystal layer and two alignment layers disposed between the first substrate and the second substrate;
    a plurality of spacers disposed between the first substrate and the second substrate;
    a seal disposed between the first substrate and the second substrate and located outside the wiring area; and
    a plurality of agglomerate polymer particles formed on at least one of the alignment layers;
    wherein the distribution density of the agglomerate polymer particles located in the wiring area on the first substrate is different from the distribution density of the agglomerate polymer particles located in a portion of the second substrate corresponding to the wiring area.

2. The display device according to claim 1, wherein the distribution density of the agglomerate polymer particles having a size of 10-100 nm located in the wiring area is higher than the distribution density of those located in the pixel area.

3. The display device according to claim 1, wherein the distribution density of the agglomerate polymer particles located in the wiring area having a size of 10-50 nm is higher than the distribution density of those having a size of 50-100 nm.

4. The display device according to claim 1, wherein the seal has a first width and a first sidewall, the first sidewall is adjacent to the wiring area, and the distribution density of the agglomerate polymer particles located on the second substrate within a range starting from the first sidewall to less than one time the first width away from the first sidewall is different from the distribution density of those within a range starting from higher than one time the first width to less than three times the first width away from the first sidewall.

5. The display device according to claim 1, wherein the distance between the agglomerate polymer particles having a size of 50-100 nm located in the wiring area is different from the distance between those located in the pixel area.

6. The display device according to claim 1, wherein the distribution density of the agglomerate polymer particles having a size of 50-100 nm located in the wiring area on the first substrate is lower than the distribution density of those on the second substrate.

7. The display device according to claim 1, wherein the wiring area is adjacent to the pixel area.

8. The display device according to claim 1, further comprising a black matrix on the second substrate.

9. The display device according to claim 1, further comprising a thin film transistor array on the first substrate.

10. The display device according to claim 1, further comprising a color filter layer on the first substrate.

11. The display device according to claim 1, wherein the wiring area comprises a gate driver on panel (GOP) or a data driver on panel.

* * * * *